Figure 1:
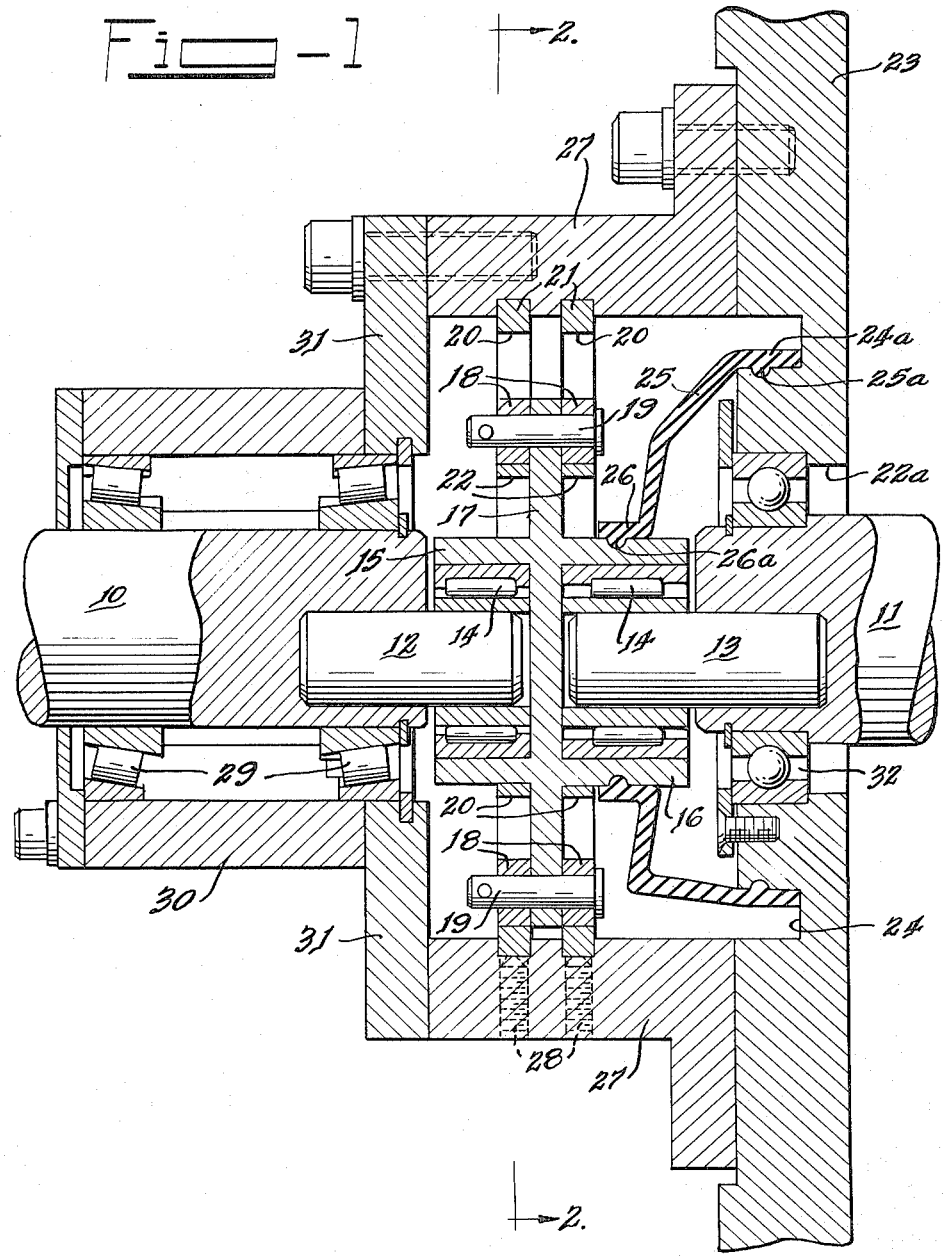

Fig-2

United States Patent Office 3,208,289
Patented Sept. 28, 1965

3,208,289
ROTARY SHAFT CONSTRUCTION WITH
DIAPHRAGM TYPE OF SEAL
Ernest Hutter, Chicago, and Peeter Elias, Bensenville, Ill.,
assignors to the United States of America as represented
by the United States Atomic Energy Commission
Filed Aug. 8, 1962, Ser. No. 215,755
3 Claims. (Cl. 74—18)

This invention relates to a shaft construction and an associated seal. More particularly, it relates to a two-part rotary shaft construction that enables a diaphragm type of seal to be employed.

It is well known to construct a rotary shaft in separate sections with an oscillating eccentric connection between them in order to facilitate the sealing of the shaft. The drawback in many constructions of this sort is that wear produced by relative movement between contacting parts of the seal may interfere with the effectiveness of the seal.

An object of the present invention is to provide a seal arrangement for a two-part rotary shaft construction in which seal relative movement between parts resulting in wear is eliminated.

A further object is to provide an improved diaphragm type of seal for a rotary shaft construction.

Other objects will appear from the description and drawings, in which:

FIG. 1 is a longitudinal section of the inventive construction of the present invention involving a two-part rotary shaft construction and a diaphragm type of seal, and FIG. 2 is a transverse sectional view taken on the line 2—2 of FIG. 1.

As shown in FIG. 1, aligned driving and driven shafts 10 and 11 carry at their spaced facing ends, aligned reduced eccentric extensions 12 and 13, which are rotatably mounted by needle bearings 14 in aligned central cylindrical portions 15 and 16 formed on opposite sides of a shiftable drive-transmitting plate 17. This plate, which is circular, carries two sets of diametrally opposed bearing members 18, which are rotatably mounted on pins 19 projecting through the shiftable plate 17. The bearing members 18 are received in two diametrally opposed openings 20 formed in each of two stationary bearing plates 21, which engage opposite sides of the shiftable plate 17 so as to permit it to move only in its own plane. The stationary plates 21 have central openings 22, which loosely receive the cylindrical portions 15 and 16 on the shiftable plate 17. As shown in FIG. 2, the openings 20 and 22 and the exteriors of the portions 15 and 16 and the bearing members 18 are circular. The difference between the diameter of the central openings 22 and the outer diameter of the portions 15 and 16 is at least as much as that between the diameter of the openings 20 and the outer diameter of the bearing members 18, so that the bearing members 18 engage the openings 20 at all times during rotation of the shafts 10 and 11.

As shown in FIG. 1, the driven shaft 11 extends through an opening 22a in a wall 23, which forms part of a closed vessel the rest of which is to the right of the wall 23 as viewed in FIG. 1. This wall has an annular groove 24 engaged at its inner side by an outer portion 24a of a flexible sealing element 25, a rib 25a formed on the portion 24a fitting a recess in the annular groove. The element 25 has an inner collar portion 26 which provides an opening in which the portion 16 on the shiftable plate 17 is tightly engaged, a rib 26a on the collar portion fitting a groove in the portion 16 of plate 17.

The stationary plates 21 are supported and fixed against movement by brackets 27 and set screws 28. The brackets 27 have grooves receiving the ends of the bearing plates 21, and the set screws 28 are threaded through the brackets into engagement with the ends of the bearing plates. The brackets are attached to the wall 23.

The shaft 10 is journaled by thrust bearings 29 in a collar 30 carried by pieces 31 on the brackets 27. The shaft 11 is journaled on a ball bearing 32 in the opening 22a in the wall 23.

In operation, rotation of the driving shaft 10 makes its extension 12 revolve, and the consequent oscillating movement of the shiftable plate 17 results in revolving of the extension 13 and rotation of the driven shaft 12.

The significant feature of the present invention is that the bearing members 18 of the shiftable plate 17 and the openings 20 in the stationary plates 21 in which the bearing members 18 roll constrain the shiftable plate 17, so that as it gyrates, it transmits the revolution of the shaft extension 12 to the shaft extension 13, while the shiftable plate 17 does not rotate, so that its portion 16 forms with the sealing element 25 and the wall 23 a closed, gyrating diaphragm. As the collar 26 of the sealing element 25 gyrates with the shiftable plate 17, there is no relative rotation between the collar and the plate, and consequently wear of the collar due to rubbing is eliminated.

It is also understood that the invention is not to be limited by the details given herein but that it may be modified within the scope of the appended claims.

What is claimed is:

1. In combination, aligned driving and driven shafts having their ends facing one another in spaced relationship, aligned reduced eccentric extensions on the ends of the shafts terminating in closely spaced relationship to one another, a shiftable drive-transmitting plate located between the extensions in a plane perpendicular to the shafts and having aligned central cylindrical portions projecting from opposite sides of the plate to receive the shaft extensions, bearings rotatably mounting the shaft extensions in the cylindrical portions of the shiftable plate, stationary bearing plates engaging opposite sides of the shiftable plate to prevent it from moving axially of the shafts, each stationary plate having a central opening loosely receiving the cylindrical portions and two diametrally opposed circular openings radially outward of the central opening, two sets of diametrally opposed bearing members located at opposite sides of the shiftable plate and loosely received in the diametrally opposed openings in the stationary plates, pins mounting the bearing members on the shiftable plate so as to enable them to roll against the diametrally opposed openings in the stationary plates, a wall having an annular groove and an opening lying inwardly of the annular groove, one of the shafts extending through the opening, a flexible sealing element having an outer portion engaging the annular groove of the wall and a central opening in which the exterior of one cylindrical portion on the shiftable plate is tightly engaged, the shiftable plate gyrating in all directions within its plane, the rolling of the bearing members in the two diametrally opposed openings of each stationary plate preventing rotation of the shiftable plate and thus eliminating sliding of the said one cylindrical portion on the opening in the sealing element and consequent wear of the sealing element.

2. In combination, aligned driving and driven shafts having their ends facing one another in spaced relationship, aligned reduced eccentric extensions on the ends of the shafts terminating in closely spaced relationship to one another, a shiftable drive-transmitting plate located between the extensions in a plane perpendicular to the shafts and having aligned central portions projecting from opposite sides of the plate for rotatably mounting the shaft extensions, the shiftable plate also having two sets of diametrally circular bearing portions lying at opposite sides of the central portions and projecting from opposite sides of the plate, stationary bearing plates engaging opposite sides of the shiftable plate to prevent it from moving axially of the shafts, each stationary plate having a central opening loosely receiving the central portions and two diametrally opposed circular openings lying radially outward of the central opening, and loosely receiving the bearing portions, a wall through which one of the shafts extends, a flexible sealing element having an outer portion engaging a portion of the wall and a central opening in which the exterior of one central portion of the shiftable plate is tightly engaged, the shiftable plate gyrating in all directions within its plane, the contact of the bearing portions of the shiftable plate with the two diametrally opposed openings of each stationary plate preventing rotation of the shiftable plate and thus eliminating sliding of the said one central portion on the opening in the sealing element and consequent wear of the sealing element.

3. In combination, aligned driving and driven shafts having their ends facing one another in spaced relationship, aligned reduced eccentric extensions on the ends of the shafts terminating in closely spaced relationship to one another, a shiftable drive-transmitting plate located between the extensions in a plane perpendicular to the shafts and having aligned central portions projecting from opposite sides of the plate to receive the shaft extensions, the shiftable plate also having two sets of diametrally opposed circular bearing portions lying at opposite sides of the central portions and projecting from opposite sides of the plate, constraining means engaging opposite sides of the shiftable plate to prevent it from moving axially of the shafts, the constraining means having central openings loosely receiving the central portions and two sets of diametrally opposed circular openings lying radially outward of the central openings, and loosely receiving the bearing portions, a wall through which one of the shafts extends, a flexible sealing element having an outer portion engaging a portion of the wall and a central opening in which the exterior of one central portion of the shiftable plate is tightly engaged, the shiftable plate gyrating in all directions within its plane, the contact of the bearing portions of the shiftable plate with the two sets of diametrally opposed openings of the constraining means preventing rotation of the shiftable plate and thus eliminating sliding of the said one central portion on the opening in the sealing element and consequent wear of the sealing element.

References Cited by the Examiner
FOREIGN PATENTS 337,659 11/30 Great Britain.
873,137 7/61 Great Britain.

BROUGHTON G. DURHAM, *Primary Examiner*

UNITED STATES PATENT OFFICE
CERTIFICATE OF CORRECTION

Patent No. 3,208,289 September 28, 1965

Ernest Hutter et al.

It is hereby certified that error appears in the above numbered patent requiring correction and that the said Letters Patent should read as corrected below.

Column 3, line 2, after "diametrally" insert -- opposed --.

Signed and sealed this 27th day of September 1966.

(SEAL)
Attest:

ERNEST W. SWIDER
Attesting Officer

EDWARD J. BRENNER
Commissioner of Patents